United States Patent
Rentel et al.

[15] 3,635,745
[45] Jan. 18, 1972

[54] PROCESS FOR CONVERTING DYESTUFFS OF THE ARYL-PARAROSANILINE SULFONIC ACID SERIES INTO VALUABLE PIGMENTS HAVING A HIGH TINCTORIAL STRENGTH

[72] Inventors: Heinz Rentel, Schonberg/Taunus; Ernst Spietschka, Oberauroff, both of Germany

[73] Assignee: Farbwerke Hoechst Aktiengesellschaft vormals Meister Lucius & Bruning, Frankfurt am Main, Germany

[22] Filed: July 25, 1969

[21] Appl. No.: 845,094

[30] Foreign Application Priority Data

Aug. 3, 1968 Germany.....................P 17 69 912.6

[52] U.S. Cl. ........................106/288 Q, 106/308 F, 106/309
[51] Int. Cl. ...............................................................C09c
[58] Field of Search..........................106/309, 288 Q, 308 F

[56] References Cited

FOREIGN PATENTS OR APPLICATIONS 272,740  11/1962  Australia..............................106/288 Q
655,458  7/1951  Great Britain......................106/308 F

*Primary Examiner*—James E. Poer
*Assistant Examiner*—H. M. S. Sneed
*Attorney*—Curtis, Morris & Safford

[57] ABSTRACT

Process for converting dyestuffs of the aryl-pararosaniline sulfonic acid series into coloristically valuable pigments by dissolving the dyestuffs in water with the addition of alkalis, mixing the aqueous-alkaline solution of the dyestuff with an aqueous-alkaline solution of such natural resinic acids or acid modified products thereof which can be precipitated from their alkaline solution by the addition of acids, and precipitating the dyestuff product from its solution by addition of an acid. The products obtained according to the present invention are easily dispersible pigment powders having a high tinctorial strength and a soft grain.

11 Claims, No Drawings

PROCESS FOR CONVERTING DYESTUFFS OF THE ARYL-PARAROSANILINE SULFONIC ACID SERIES INTO VALUABLE PIGMENTS HAVING A HIGH TINCTORIAL STRENGTH

The present invention relates to a process for converting dyestuffs of the aryl-pararosaniline sulfonic acid series into coloristically valuable pigments.

It is known that aqueous pastes of dyestuffs of the aryl-pararosaniline sulfonic acid series of the general formula

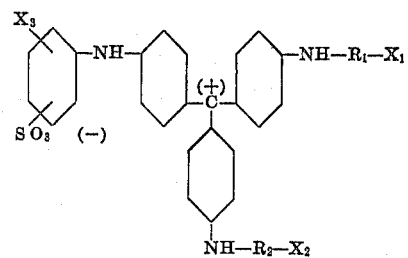

in which $R_1$ and $R_2$ are direct linkages or represent arylene radicals, $X_1$, $X_2$ and $X_3$ represent hydrogen or halogen atoms or alkyl-, alkoxy-, sulfonamide- or nitro-groups, cannot be converted by means of a simple drying process into useful pigment powders having a high tinctorial strength.

Owing to their extremely fine dispersion which is reflected in specific surfaces up to 100 m.² per gram and more and, correspondingly, in medium diameters of the particles of 0.05μ and less, organic pigments possess a high surface energy which may certainly be increased by disturbances in the crystal lattice. This high surface energy causes, above all, aggregation and agglomeration, of organic pigments with accumulation of their crystals, already during the process of their preparation, particularly during the drying and grinding. When the pigments are incorporated into the materials to be dyed, for example into lacquers, printing inks and synthetic materials, the agglomerates must be distributed as completely as possible into their single components, i.e., they must again be dispersed, this process involving a considerable amount of mechanical energy. With reasonable technical expenditure, the process of dispersion is generally not quantitative, i.e., beside the completely dispersed crystals, there are still more or less numerous agglomerates in the medium of application; when processed they may cause a number of disturbances, for example, quick destruction of the printing blocks in the printing of such printing inks.

It is known that particularly hard agglomerates are formed by the strongly polar and strongly hydrophilic pigments of the above-indicated general formula. In printing varnishes, they can be dispersed, under reasonable technical conditions, only very incompletely, and the obtained printing inks furnish only very pricked prints of weak color. Therefore, the practical use of these dyestuffs in powder form is limited.

These difficulties have been disclosed in numerous publications, for example, by E. K. Fischer in Am. Ink Maker 23, (1945), No. 12; in U.S. Pat. No. 2,153,515; in German Pat. No. 390,812; in Kittel, "Pigmente," page 569.

Since these pigments cannot be dispersed with because of their coloristic properties for the technical use, particularly for book printing and offset printing, several methods have been described in order to make their application possible in the graphic industry. The most common method is the so-called Flush process. Herein, press cake and Flush varnish are kneaded together and, while the drying process which leads to agglomeration is avoided, the molecules of the binder remove and repel herein more or less completely the water which is still present on the surface of the pigments. Apart from the technical expenditure necessary for the Flush process, which is carried out discontinuously, a great disadvantage of the Flush pastes is their necessarily relatively low content of pigment. The great portion of binder being in general at least 60 percent by weight, does not only lead to difficulties in the preparation of a balanced and optimal formulation of the printing ink, but it also prevents a general use on a large scale. Thus, the usual Flush pastes on the basis of linseed oil, for example, as those used in dyestuffs for offset and book printing, are unsuited for heat-set-dyestuffs.

Now, we have found that aryl-pararosaniline sulfonic acids of the general formula

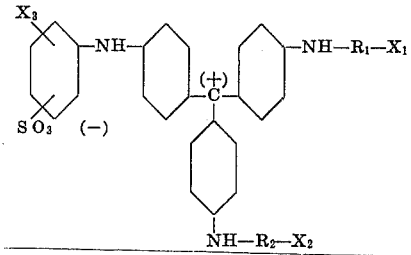

wherein $R_1$ and $R_2$ represent direct linkages or arylene radicals, especially phenylene or naphthylene radicals, $X_1$, $X_2$ and $X_3$ represent hydrogen atoms, chlorine atoms or bromine atoms, nitro-, sulfonamide- or alkyl- or alkoxy-groups having one to three carbon atoms, with the proviso that $X_1$ and $X_2$ only represent hydrogen atoms if $R_1$ and $R_2$ are direct linkages, can be converted into easily dispersible pigment powders having high tinctorial strength and soft grain by dissolving the dyestuffs of the above-mentioned formula in water with the addition of alkalis, mixing intimately, at a temperature in the range of from 60° to 100° C., the aqueous-alkaline solution of dyestuff thus obtained with an aqueous-alkaline solution of such natural resinic acids or the acid-modified products thereof which can be precipitated from their aqueous-alkaline solutions by the addition of acids, and by precipitating the product from its alkaline solution by addition of an acid.

The aqueous alkaline solutions of the dyestuffs or resins are most suitably prepared with sodium hydroxide or potassium hydroxide.

The two aqueous alkaline solutions are preferably mixed at a temperature in the range of from 80° to 100° C. The product may be separated from the alkaline solution, chiefly by means of mineral acids, such as hydrochloric acid, sulfuric acid or phosphoric acid. The acid is added in such an amount that an excess of acid is obtained and the above-named product is precipitated from the solution. It is suitable to keep the suspension obtained after addition of acid, for some time, preferably for 5 minutes to 1 hour, at an elevated temperature, preferably at 70° to 100° C. The pigment preparation thus obtained is then filtered off, washed free from salts with water and dried. In some cases it is advantageous to cool the pigment suspension before filtering it, preferably to a temperature of 30° to 50° C. The product thus obtained is then dried, preferably under reduced pressure and at an elevated temperature. The temperature must be below the softening point of the resin used in the individual cases. In general, temperatures in the range of from about 40° to 100° C. are suitable.

As regards the quantity ratio of the dyestuff and the natural resin, the natural resin is suitably used in a quantity of from 10 to 70 percent by weight, preferably from 23 to 50 percent by weight, referred to the weight of the dry starting dyestuff.

By the designation "natural resins" there are to be understood balsam colophony as well as root resin or tall resin, the oxidation products thereof which have formed when the resin was deposited in the open air, and mixtures of resinic acids or oxidized resinic acids.

The designation "acid-modified products" signifies the following groups of substances which are already known and the main processes of preparation of which have already been described (cf. W. Sandermann, "Naturharze, Terpentinol, Tallol"):

1. Oxidized natural resinic acids.
2. Hydrogenated natural resinic acids (U.S. Pat. No. 2,174,651).
3. Dimerized natural resinic acids (German Pat. No. 564,897; U.S. Pat. No. 2,124,675).
4. Disproportioned natural resinic acids.
5. Acid esters of natural resinic acids with monofunctional, difunctional and/or polyfunctional alcohols or mixtures thereof, or by reaction of natural resinic acids with epoxy resins or ethylene oxide. (W. Sandermann, 1 c., pate 217)
6. Aldehyde modified acid resins by addition of, for example, formaldehyde to colophony or of other suitable aldehydes (German Pat. No. 742,209), or further condensation of aldehyde modified natural resinic acids with phenols or formaldehyde and phenols (U.S. Pat. Nos. 1,658,828 and 2,007,983) as well as reaction products obtained by oxonation or hydroformylation of the natural resinic acids (U.S. Pat. No. 2,327,066).
7. Acid maleinate resins and other resins obtained by reaction of dienes with natural resinic acids, as described in Sandermann 1.c., page 240. For example, adducts of laevopimaric acid and maleic acid-anhydride, addition products of maleic acid or fumaric acid on natural resinic acids or acid resins or their acid esters prepared by means of acrylic acid.
8. Resinic acid-phenol-adducts which are obtained, under the action of strongly acid or acid-splitting catalysts, by addition of phenols to natural resinic acids, and which adducts are characterized by the fact that they contain free acid groups as well as phenolic hydroxy groups, which may be partially esterified. (German Pat. Nos. 581, 956, 582, 846, 652, 602, 536, 170; French Pat. No. 923,602).
9. Addition products of natural resinic acids with hydrocarbons containing double linkages, which have been obtained in the presence of strongly acid compounds such as boron-trifluoride. Such hydrocarbons are, for example, butadiene, isoprene, isobutene, cyclopentadiene, divinylbenzene, vinyltoluene, styrene, coumarone, indene and carbazole (U.S. Pat. Nos. 2,527,577, 2,527,578 and 2,532,120; German Pat. No. 578,039; French Pat. No. 958,920).
10. Resin modified acid phenol resins, prepared by reacting natural resin acids with condensation products of phenolaldehyde, preferably of phenol, alkylphenol or aralkylphenolformaldehyde, or mixtures thereof. The condensation products of phenolformaldehyde may be prepared under the action of alkaline condensing agents, preferably with more than 1 mol of aldehyde per mol of phenol, or also under the action of acid condensing agents with less or more than 1 mol of formaldehyde or para-formaldehyde. Another process of preparation consists in condensing the natural resinic acids together with phenols and aldehydes and the catalysts. (German Pat. Nos. 254,411, 269, 269,959, 281,939).
11. Acid reaction products of natural resinic acids with xylene-formaldehyde-resins (German Pat. No. 815,544).
12. Acid reaction products of natural resinic acids with terpene-maleic-resins, as those known, for example under the designation "Petrex" (Littman, E. R.: Ind. Engg. Chem. 28, 1150 ([1936]).

The pigments obtained according to the present invention can be distributed in an extraordinarily easy manner in the binders common in the dyestuff printing industry. The printing inks which have been pigmented with these dyestuffs can be printed in a completely satisfactory manner. They furnish bright prints of high tinctorial strength. They allow universal application in book printing and offset printing inks as well as in heat-set-inks and even in illustration intaglio printing. Other advantages over the Flush pastes are particularly the easier handling and the good stability during storage, which exclude undesired increase of viscosity when stored for a longer time.

The process of the present invention is especially suited for continuous working processes.

The following examples illustrate the present invention but they are not intended to limit it thereto.

EXAMPLE 1

Two hundred ninety-four parts by weight of the moist press cake of about 25 percent by weight, of triphenyl-pararosaniline-monosulfonic acid of the formula

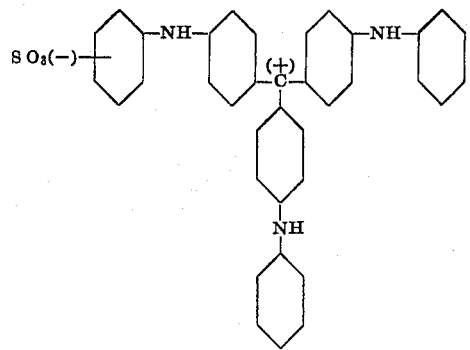

were stirred in 450 parts by weight of water. After addition of 30 parts by weight of 48 percent sodium hydroxide solution, the mixture was heated to 90°–100° C. whereby organic solvents still adhering were distilled off. To the dyestuff solution obtained, there was added, while stirring, a solution of colophony which had been prepared by heating 32.1 parts by weight of colophony, 10.5 parts by weight of a 48 percent sodium hydroxide solution and 375 parts by weight of water. Then 63 parts by weight of concentrated hydrochloric acid in 450 parts by weight of water were added, whereupon the dyestuff and the resin precipitated together, they were kept for about 15 minutes at 90°–100° C. The dyestuff and the resin were then suction-filtered, washed free from salts and dried at about 60° C. About 110 parts by weight of a 70 percent by weight blue dyestuff powder were obtained, which, in contrast to the dyestuff prepared by the usual method, could be easily processed into printing inks of high tinctorial strength.

Instead of the triphenyl-pararosaniline-monosulfonic acid, tri-m-tolylpararosaniline-monosulfonic acid may be treated with the same success. A blue pigment powder was obtained which could be easily processed into printing inks of high tinctorial strength.

EXAMPLE 2

Ninety eight parts by weight of the moist press cake of about 25 percent of tri-p-chloro-phenyl-pararosaniline-monosulfonic acid of the formula

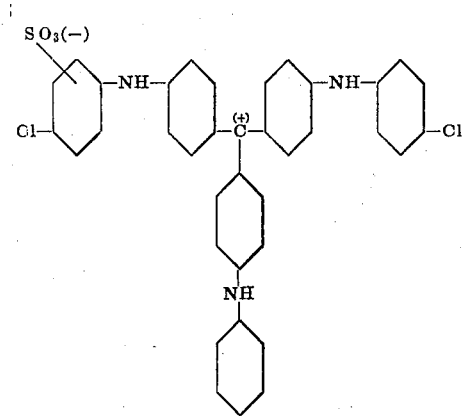

were stirred in 300 parts by weight of water. After addition of 10 parts by weight of 48 percent sodium hydroxide solution, the mixture was heated to 90° to 100° C. until all the dyestuff was dissolved. Then a solution of 10.7 parts by weight of an oxidized, hydrogenated, dimerized or disproportioned natural resinic acid or a mixture thereof in 3.5 parts by weight of 48 percent sodium hydroxide solution and 125 parts by weight of water was added thereto and the whole was intimately stirred. Then the dyestuff and the resin were precipitated together by addition of 21 parts by weight of concentrated hydrochloric acid in 42 parts by weight of water and they were kept for about 15 minutes at 90° C. The mixture was then cooled to 50° C., the preparation was suction-filtered, washed free from salts and dried at about 60° C. About 36 parts by weight of a reddish blue pigment powder having 70 percent by weight were obtained; this pigment powder, in contrast to the dyestuff dried by the usual methods, could be easily processed into printing inks of high tinctorial strength.

Instead of the tri-p-chloro-phenyl-pararosaniline-monosulfonic acid, there might be used with the same success, tri-p-nitro-phenyl-pararosaniline monosulfonic acid. Also the pigment thus obtained could be easily dispersed in printing varnishes and furnished intensely colored blue prints with a strong red tint, being free from specks. At the same time, the dyestuffs are distinguished by an excellent brightening effect in black bookprinting and offset printing inks.

EXAMPLE 3

One thousand parts by weight of a moist press cake of about 20 percent of tri-m-anisyl-pararosaniline monosulfonic acid of the formula

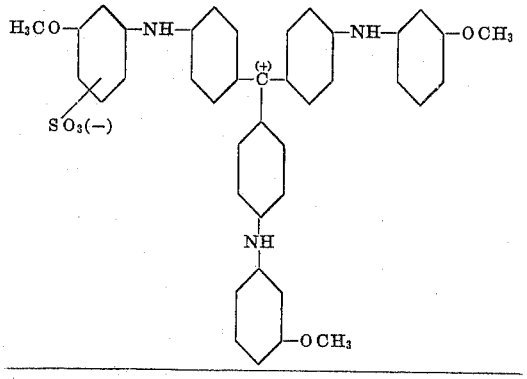

were stirred in 1,200 parts by weight of water. Eighty parts by weight of 48 percent sodium hydroxide solution were added thereto and the whole was heated to 95°–100° C. until all the dyestuff was dissolved. A hot solution of 100 parts by weight of an acid natural resinic acid which had been partially esterified with glycerine and pentaerythrite, in 31.8 parts by weight of a 33 percent sodium hydroxide solution and 1,000 parts by weight of water was then added and the whole was stirred for a short time at 95°–97° C. The hot mixture was then mixed within 5 minutes while stirring vigorously, with a mixture of 1,200 parts by weight of water and 168 parts by weight of a 36 percent hydrochloric acid solution which had been heated to the same temperature, the whole was kept for 30 minutes at the indicated temperature and then rapidly cooled to 50° C. The precipitated dyestuff was suction-filtered, filtered, washed free from salts and dried at 50° C. in vacuo. About 300 parts by weight of a 66 percent blue powder were obtained which, in contrast to the dyestuff which had been precipitated without resin, could be very easily processed into printing inks of high yield.

The resin used in the above example was prepared in the following manner:

One thousand parts by weight of balsam colophony, 14 parts by weight of pentaerythrite were heated, while stirring first for 1 hour to 200° C. and then for 2 hours to 250° C., while carbonic acid was introduced. Then 0.5 parts by weight of calcium acetate were added, the mixture was kept for 3 hours at 260° C. and then cooled. A resin melting at about 73° C. and having an acid number of about 111 was obtained.

Corresponding results were obtained by using, as a treating agent, a resin prepared in the following manner:

One thousand parts by weight of balsam colophony were melted, 200 parts by weight of styrene were added thereto and totally 10 parts by volume of boron-fluoride-dimethyl-etherate were added in 10 equal parts within 1 hour, while stirring, at 120° C. After 2 hours, the temperature was raised to 130°–135° C., after another hour it was raised to 200° C., in a weak vacuum, the vacuum was then reduced to 50 Torr and the evacuation was continued for 1 hour at 250° C. About 1,114 parts by weight of a resin having a melting point of 65° C. and an acid number of 99.5 were obtained.

EXAMPLE 4

Two thousand one hundred parts by weight of the moist press cake having 25 percent by weight of triphenyl-pararosaniline monosulfonic acid of the formula

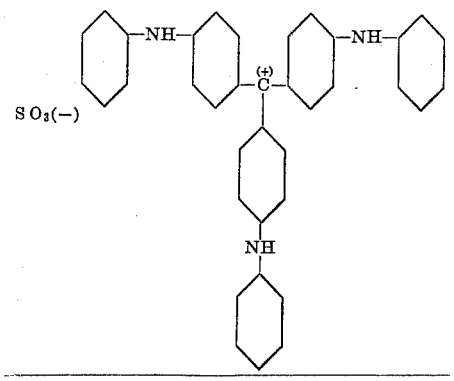

were stirred in 3,125 parts by weight of water. After addition of 210 parts by weight of a 48 percent sodium hydroxide solution, the mixture was heated to 97°–100° C. whereupon organic solvents which were still adhering were distilled off and the dyestuff was dissolved. Then a hot solution of 225 parts by weight of an aldehyde-modified resinic acid (obtained by addition of 108 parts by weight of para-formaldehyde (strength 96 percent) to 2,040 parts by weight of balsam colophony at 120° C.; m.p. 81° C., acid number 124) in 73.5 parts by weight of a 33 percent sodium hydroxide solution and 2,250 parts by weight of water was added, and the whole was stirred at 95°–97 C. for a short time. The hot mixture was then stirred, vigorously within 10 minutes, into a mixture which had been heated to the same temperature, of 3,124 by weight of water and 441 parts by weight of a 36 percent hydrochloric acid solution, kept for 45 minutes at 95°–97° C. and then cooled quickly to 50° C. The precipitated dyestuff preparation was suction-filtered, washed free from salts and dried at 50° C. in vacuo. About 750 parts by weight of a 70 percent blue powder were obtained which, in contrast to a corresponding dyestuff of the same constitution, which had been reprecipitated without resin, could be very easily processed into printing inks of high yield. Equally good results were obtained by using, instead of the aldehyde-modified natural resinic acid, adducts of resinic acid-phenol or adducts of resinic acid-phenol-aldehyde, provided these adducts were soluble in an alkaline medium.

The adducts of resinic acid-phenol used may be prepared, for example, in the following manner:

One thousand parts by weight of balsam colophony were melted, then 100 parts by weight of phenol and 100 parts by weight of xylene were added, and 7 parts by volume of boron-fluoride-dimethyletherate were added at 110° C. The whole was then heated for 2 hours to 115°–120° C., the temperature was raised to 135°–140° C. and, after 2 hours, there were added 300 parts by weight of xylene, 150 parts by weight of water and 20 parts by weight of saturated sodium chloride solution. The aqueous layer was removed at 95° C. and the xylene layer was distilled at 200° C. About 1,002 parts by weight of an adduct of resinic acid-phenol were obtained which melted at 100° C. and the acid number of which was 126.

The resin-modified acid phenol resins or the natural resinic acid-modified phenol resins, which might have been subsequently partially esterified may be prepared, for example, by adding the phenol-aldehyde condensation products, which had been prepared separately, to the natural resinic acids which had been heated to 100°–180° C. Another method of preparation, however, consists in condensing the natural resinic acids together with phenols, aldehydes and the catalysts. (German Pat. Nos. 254,411, 269,959 281,939).

The phenol-formaldehyde condensation products may be prepared under the action of alkaline condensation agents, preferably with more than 1 mol of aldehyde per 1 mol of phenol, as well as under the action of acid condensation agents with more or less than 1 mol of formaldehyde or paraformaldehyde. The preparation of these phenol-aldehyde-condensation products or phenol-formaldehyde-condensation products is as known as their reaction products with natural resinic acids. ("Albertol acids," A. Greth, Kunstoffe 31, 345 (1941); K. Hultzsch, Chemie der Phenolharze).

EXAMPLE 5

Two hundred parts by weight of 100 percent tri-p-sulfamido-phenyl-pararosaniline monosulfonic acid of the formula

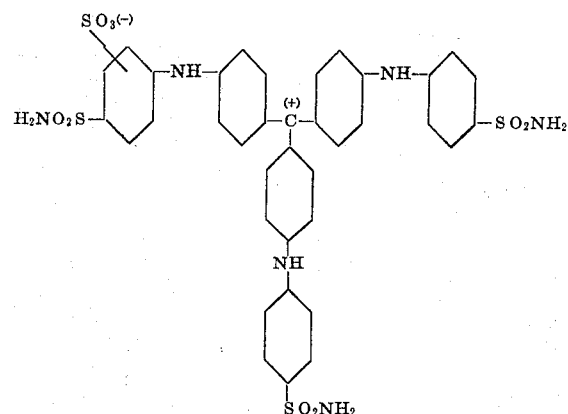

were stirred in 2,000 parts by weight of water. Then 80 parts by weight of a 48 percent sodium hydroxide solution were added and the whole was heated to 90°–100° C. until the dyestuff was dissolved. Then a hot solution of 134 parts by weight of an acid acrylic acid resin in 130 parts by weight of a 33 percent sodium hydroxide solution and 1,340 parts by weight of water was added and the whole was stirred for a short time at 95°–97° C. 157.5 parts by weight of a 96 percent sulfuric acid solution in 800 parts by weight of water were added, within 5–10 minutes, while stirring vigorously, to the hot mixture, the mixture was kept for 10 minutes at 95°–97° C. and then cooled quickly to 50° C. by adding ice. The precipitated dyestuff preparation was suction-filtered, washed free from salts and dried at 60°–70° C. in vacuo. About 330 parts by weight of a 60 percent blue powder were obtained which, in contrast to a dyestuff of the same constitution which had been reprecipitated without resin, could very easily be dispersed in book printing varnishes and furnished intensely colored prints free from specks.

The acid acrylic acid resin used was prepared by reacting at 200° C., 1,000 parts by weight of tall resin with 150 parts by weight of acrylic acid. After a reaction time of 2 ½ hours, the mixture was esterified for 3 hours at 200°–250° C., with 80 percent by weight of glycerine and worked up as usual. About 1,136 parts by weight of an acid acrylic acid resin having a melting point of 119° C. and an acid number of 103 were obtained.

EXAMPLE 6

One hundred and fourteen parts by weight of a moist press cake of about 17 percent of tri-m-tolyl-pararosaniline-monosulfonic acid of the formula

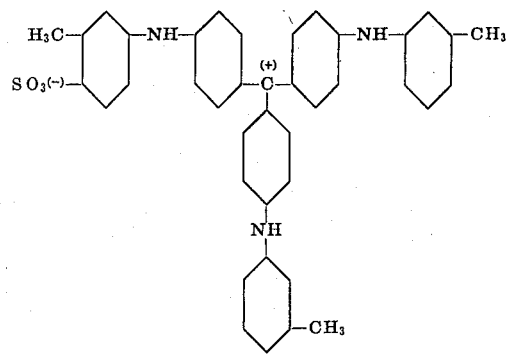

were stirred in 120 parts by weight of water. Eight parts by weight of 48 percent sodium hydroxide solution were added thereto and the whole was heated to 95°–100° C. until all the dyestuff was dissolved. Then a hot solution of 5 parts by weight of a resin-modified acid phenol resin (as described in example 4), 1.7 parts by weight of a 33 percent sodium hydroxide solution and 50 parts by weight of water was added and stirred for a short time at 85° C. The hot mixture was then mixed by vigorous stirring, within about 3 minutes, with a mixture which had been heated to the same temperature, of 14.6 parts by weight of 36 percent hydrochloric acid and 140 parts by weight of water, kept for 10 minutes at 85° C. and then cooled quickly to 50° C. by addition of ice. The precipitated dyestuff preparation was suction-filtered, washed free from salts and dried at 50°–60° C. in vacuo. About 25 parts by weight of an 80 percent blue powder were obtained which, in contrast to the dyestuff of the same constitution precipitated without resin, could be processed more easily into printing pastes of high yield and high tinctorial strength.

We claim:

1. A process for converting an aryl-pararosaniline sulfonic acid dyestuff of the formula

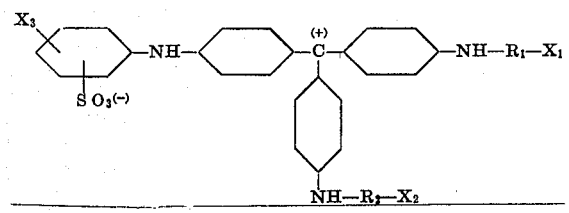

wherein $R_1$ and $R_2$ each is a direct linkage, phenylene or naphthylene, $X_1$, $X_2$ and $X_3$ each is hydrogen, chlorine, bromine, nitro, sulfonamide, alkyl of one to three carbon atoms or alkoxy of one to three carbon atoms, provided that $X_1$ and $X_2$ each is hydrogen when $R_1$ and $R_2$, respectively, is a direct linkage, into an easily dispersible pigment powder having high tinctorial strength and soft grain, which comprises dissolving said dyestuff in water with an alkali to form an aqueous-alkaline solution thereof, mixing intimately said aqueous-alkaline solution at a temperature between about 60° and about 100° C. with an aqueous-alkaline solution of a natural resin acid or a modified natural resin acid capable of being precipitated from said aqueous-alkaline solution by acid addition, the amount of said natural resin acid or modified natural resin acid being about 10 to about 70 percent by weight calculated on the weight of said dyestuff, and adding a mineral acid to the intimate mixture of said aqueous-alkaline solutions to precipitate the dyestuff product.

2. The process as claimed in claim 1, wherein oxidized, hydrogenated, dimerized or disproportionated natural resinic acids are used.

3. The process as claimed in claim 1, wherein acid esters of natural resinic acids are used.

4. The process as claimed in claim 1, wherein aldehyde-modified acidic natural resinic acids are used.

5. The process as claimed in claim 1, wherein acidic maleinate resins or resins obtained by reaction of dienes with natural resinic acids are used.

6. The process as claimed in claim 1, wherein acidic resinic acid-phenol-adducts are used.

7. The process as claimed in claim 1, wherein addition products of natural resinic acids with hydrocarbons containing double linkages are used.

8. The process as claimed in claim 1, wherein acidic condensation products of natural resinic acids with phenolaldehyde-(formaldehyde)-condensates are used.

9. The process as claimed in claim 1, wherein acidic reaction products of natural resinic acids with xylene-formaldehyde-resins are used.

10. The process as claimed in claim 1, wherein acidic reaction products of natural resinic acids with terpene-maleinate-resins are used.

11. The process as claimed in claim 1, wherein mixtures of the acid resins are used.

* * * * *